(12) United States Patent
Ishida

(10) Patent No.: US 8,852,822 B2
(45) Date of Patent: Oct. 7, 2014

(54) REFORMING SYSTEM, FUEL CELL SYSTEM, AND ITS OPERATION METHOD

(71) Applicant: Nippon Oil Corporation, Tokyo (JP)

(72) Inventor: Tomotaka Ishida, Kanagawa (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 14/150,549

(22) Filed: Jan. 8, 2014

(65) Prior Publication Data

US 2014/0127598 A1  May 8, 2014

Related U.S. Application Data

(62) Division of application No. 12/598,390, filed as application No. PCT/JP2008/058249 on Apr. 30, 2008.

(30) Foreign Application Priority Data

May 1, 2007  (JP) ................................. 2007-121060

(51) Int. Cl.
*H01M 8/18* (2006.01)
*C01B 3/38* (2006.01)
*H01M 8/04* (2006.01)
*H01M 8/06* (2006.01)
*H01M 8/12* (2006.01)

(52) U.S. Cl.
CPC ..... *H01M 8/0618* (2013.01); *C01B 2203/1223* (2013.01); *C01B 3/38* (2013.01); *H01M 8/04373* (2013.01); *H01M 8/04365* (2013.01); *C01B 2203/1619* (2013.01); *C01B 2203/1247* (2013.01); *H01M 8/04776* (2013.01); *C01B 2203/1241* (2013.01); *C01B 2203/1211* (2013.01); *H01M 8/04223* (2013.01); *Y02E 60/525* (2013.01); *C01B 2203/1229* (2013.01); *C01B 2203/066* (2013.01); *Y02E 60/50* (2013.01); *H01M 8/04119* (2013.01); *H01M 8/04828* (2013.01); *H01M 8/04753* (2013.01); *C01B 2203/0233* (2013.01); *H01M 8/04835* (2013.01); *H01M 8/0612* (2013.01); *H01M 2008/1293* (2013.01)
USPC ........... 429/423; 429/412; 429/458; 429/425; 423/648.1; 423/650; 423/651; 423/652

(58) Field of Classification Search
USPC ..................... 429/17, 20, 412, 423, 458, 425; 423/648.1, 650, 651, 652
See application file for complete search history.

(56) References Cited

U.S. PATENT DOCUMENTS 6,797,418 B1 * 9/2004 Nomura et al. ............... 429/408
6,811,578 B2   11/2004 Kunitake et al.
(Continued)

FOREIGN PATENT DOCUMENTS

CN  1418387  5/2003
EP  1 271 679 A1  1/2003
(Continued)

OTHER PUBLICATIONS

Extended European Search Report for EP Application No. 08752250.4-1270, dated Apr. 19, 2012.
(Continued)

*Primary Examiner* — Patrick Ryan
*Assistant Examiner* — Alex Usyatinsky
(74) *Attorney, Agent, or Firm* — Finnegan, Henderson, Farabow, Garrett & Dunner, LLP

(57) ABSTRACT

When terminating power generation by a fuel cell 3 in a fuel cell system 1, an amount of a raw fuel material introduced to a reforming catalyst 2a of a reformer 2 is reduced. Here, before the temperature of the reforming catalyst 2a is lowered to the un-reformed gas generation temperature, an amount of water supplied to the reforming catalyst 2a is controlled to increase the temperature of the reforming catalyst 2a. Thus, upon termination of power generation in the fuel cell 3, no un-reformed gas is generated and the reformed gas is supplied to the fuel cell 3.

6 Claims, 3 Drawing Sheets

(56) References Cited

U.S. PATENT DOCUMENTS

| | | |
|---|---|---|
| 7,025,903 B2 * | 4/2006 | Grieve et al. ............... 252/373 |
| 7,824,813 B2 | 11/2010 | Kim et al. |
| 7,838,159 B2 | 11/2010 | Gorobinskly et al. |
| 2002/0046889 A1 * | 4/2002 | Kunitake et al. ............ 180/65.3 |
| 2004/0131540 A1 * | 7/2004 | Fujii et al. ................... 423/650 |
| 2010/0119894 A1 | 5/2010 | Ishida |

FOREIGN PATENT DOCUMENTS

| | | |
|---|---|---|
| JP | 2004-220942 | 8/2004 |
| JP | 2006-269332 | 10/2006 |
| JP | 2006-351293 | 12/2006 |

OTHER PUBLICATIONS

International Search Report for International Application No. PCT/JP2008/058249 (Jul. 15, 2008).

* cited by examiner

REFORMING SYSTEM, FUEL CELL SYSTEM, AND ITS OPERATION METHOD

This application is a Divisional of application Ser. No. 12/598,390, §371(c) date of Aug. 13, 2010, for which priority is claimed under 35 U.S.C. §120, which is a national phase application of International Application No. PCT/JP2008/058249, filed Apr. 30, 2008, and claims the priority of Japanese Application No. 2007-121060, filed May 1, 2007; the entire contents of which are hereby incorporated by reference.

TECHNICAL FIELD

The present invention relates to a reforming system including a reformer to generate a reformed gas by reforming a raw fuel material with a reforming catalyst, a fuel cell system further including a solid oxide fuel cell using the reformed gas as a fuel, and its operation method.

BACKGROUND ART

A fuel cell system including a nitrogen supply unit to a fuel electrode in which nitrogen stored in a liquid nitrogen storage tank is supplied to a fuel electrode of a fuel cell when terminating power generation by a solid oxide fuel cell has been known (refer to Patent Document 1, for example). According to such a fuel cell system, the expansion of nickel and the like used for the fuel electrode, by oxidation when terminating power generation by the solid oxide fuel cell can be prevented in a fuel cell, and, as a result, the damage to an electrolyte composed of a yttria-stabilized zirconia and the like can be avoided.

Patent Document 1: Japanese Unexamined Patent Application Publication No. 2004-220942

DISCLOSURE OF THE INVENTION

However, in the conventional fuel cell system as described above, its structure becomes complicated because a liquid nitrogen storage tank and a nitrogen supply unit to a fuel electrode are required to be provided.

The present invention has been made in view of the above situation, and has an object of providing a reforming system, a fuel cell system, and its operation method, wherein the damage to a fuel cell when terminating power generation by a solid oxide fuel cell can be avoided by a simple composition.

In order to achieve the object described above, the reforming system of the present invention includes a reformer for generating a reformed gas to be used as a fuel for a solid oxide fuel cell by reforming a raw fuel material with a reforming catalyst, the reforming system comprising: means for introducing the raw fuel material to the reforming catalyst; means for introducing water to the reforming catalyst; means for detecting a temperature of the reforming catalyst; and a controlling means for raising the temperature of the reforming catalyst by causing the means for introducing water to control an amount of water supplied to the reforming catalyst before the temperature detected by the means for detecting the temperature is dropped to the temperature at which an un-reformed gas is generated by causing the means for introducing the raw fuel material to reduce an introduction amount of the raw fuel material when terminating power generation by the fuel cell.

Further, the fuel cell system of the present invention includes a reformer for generating a reformed gas by reforming a raw fuel material through the use of a reforming catalyst, and a solid oxide fuel cell using the reformed gas as a fuel, the fuel cell system comprising: means for introducing the raw fuel material to the reforming catalyst; means for introducing water to the reforming catalyst; means for detecting a temperature of the reforming catalyst; and a controlling means for raising the temperature of the reforming catalyst by causing the means for introducing water to control an amount of water supplied to the reforming catalyst before the temperature detected by the means for detecting the temperature is dropped to the temperature at which un-reformed gas is generated by causing the means for introducing the raw fuel material to reduce an introduction amount of the raw fuel material when terminating power generation by the fuel cell.

Further, the operation method of the fuel cell system of the present invention includes a reformer for generating a reformed gas by reforming a raw fuel material with the reforming catalyst and a solid oxide fuel cell using the reformed gas as a fuel, the method comprising a controlling means for raising a temperature of the reforming catalyst by causing the means for introducing water to control an amount of water supplied to the reforming catalyst before the temperature is dropped to the temperature at which un-reformed gas is generated by reducing an introduction amount of the raw fuel material to the reforming catalyst when terminating power generation by the fuel cell.

In the reforming system, the fuel cell system, and its operation method as described above, an introduction amount of the raw fuel material to the reforming catalyst in the reformer is reduced when terminating power generation by the solid oxide fuel cell, and at this time, the temperature of the reforming catalyst is raised by controlling the amount of water supplied to the reforming catalyst before the temperature of the reforming catalyst is dropped to the temperature at which the un-reformed gas is generated. In this way, the generation of the un-reformed gas at the time of terminating power generation by the solid oxide fuel cell is prevented and the reformed gas is supplied to the fuel cell. Accordingly, the damage to the fuel cell when terminating power generation by the solid oxide fuel cell can be avoided by a simple composition without installing a liquid nitrogen storage tank and a nitrogen supply unit to a fuel electrode, in contrast to the conventional method.

In the reforming system of the present invention, the controlling means preferably causes the means for introducing water to change the amount of water supplied to the reforming catalyst, depending on the reduction in an introduction amount of the raw fuel material by the means for introducing the raw fuel material. In this way, the generation of the un-reformed gas can be prevented without fail by raising the temperature of the reforming catalyst.

According to the present invention, the damage to the fuel cell when terminating power generation by the solid oxide fuel cell can be avoided by a simple composition.

DESCRIPTION OF THE REFERENCE SYMBOLS

1 Fuel cell system
2 Reformer

2a Reforming catalyst
3 Fuel cell
4 Raw fuel material introduction unit (means for introducing raw fuel material)
5 Water introduction unit (means for introducing water)
6 Temperature detector (means for detecting temperature)
7 Temperature detector
8 Control unit (controlling means)
9 Reforming system

BEST MODES FOR CARRYING OUT THE INVENTION

Hereinafter, preferred embodiments of the present invention will be described in detail with reference to the drawings.

Figure 1:
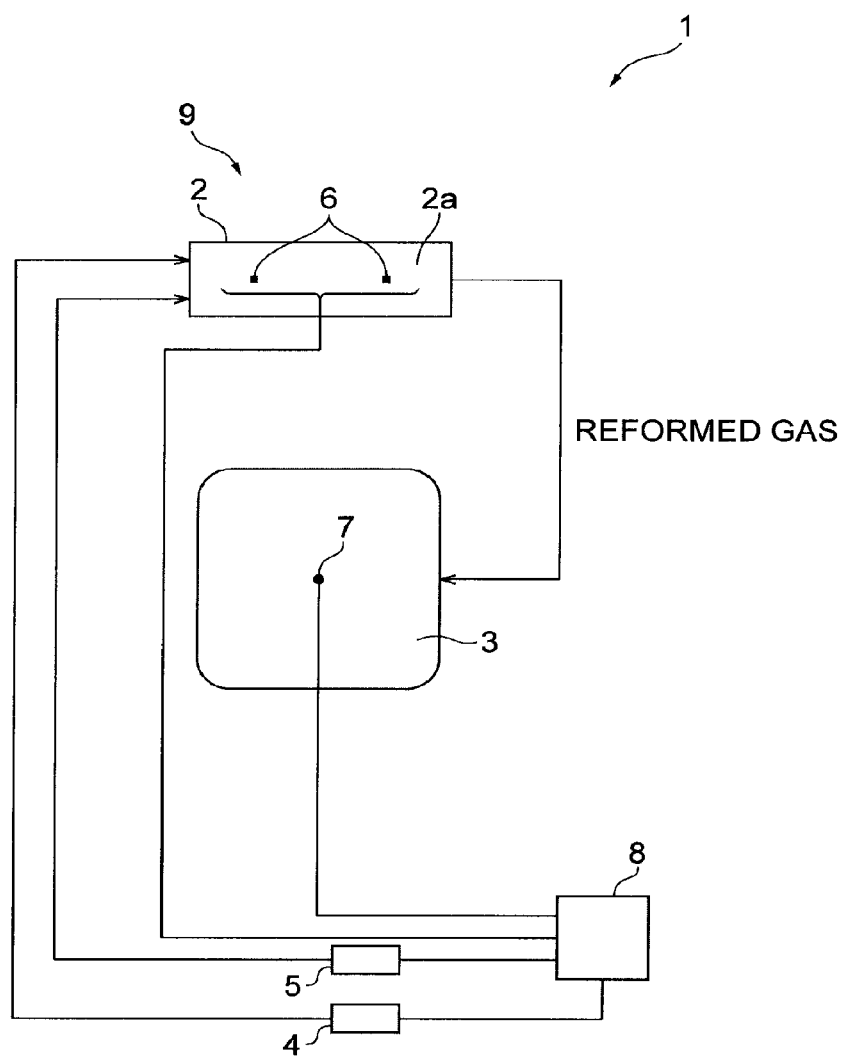
FIG. 1 is a front view illustrating an embodiment of the fuel cell system of the present invention.

As shown in FIG. 1, a fuel cell system 1 comprises a reformer 2 to generate a reformed gas by reforming a raw fuel material with a reforming catalyst 2a and a solid oxide fuel cell 3 using the reformed gas as a fuel.

The reformer 2 generates a reformed gas containing hydrogen by a steam-reforming reaction of a raw fuel material with a steam (water) by the reforming catalyst 2a. The steam-reforming reaction is an endothermic reaction, and thus the reformer 2 utilizes an exhaust heat of the fuel cell 3 for the steam-reforming reaction. As the reforming catalyst 2a, a heretofore known steam-reforming catalyst can be used. Examples of the steam-reforming catalyst can include a ruthenium catalyst and a nickel catalyst.

As the raw fuel material, a hydrocarbon fuel heretofore known as a raw material for the reformed gas in the field of a solid oxide fuel cell, namely, a compound containing carbon and hydrogen (which may optionally contain other elements such as oxygen) in its molecule or a mixture thereof, can be appropriately selected for the use. For examples, a compound containing carbon and hydrogen such as a hydrocarbon, an alcohol, or an ether may be included for it. More specifically, examples of them include hydrocarbons such as methane, ethane, propane, butane, a natural gas, an LPG (liquefied petroleum gas), a city gas, gasoline, naphtha, kerosene, and a light oil; alcohols such as methanol and ethanol; and ethers such as dimethyl ether. Among them, kerosene and an LPG are preferable in terms of availability. In addition, kerosene and an LPG are useful in an area where delivery lines of a city gas are not prevailed because they can be stored independently. Further, a solid oxide fuel cell using kerosene or an LPG is useful as an emergency power source.

The fuel cell 3 generates an electric power by a plurality of cells referred to as SOFC (Solid Oxide Fuel Cell). The cell is composed by a solid oxide electrolyte placed between a fuel electrode and an air electrode. The electrolyte is formed of, for example, an yttoria-stabilized zirconia (YSZ) and conducts an oxide ion at the temperature ranging from 800 to 1,000° C. The fuel electrode is formed of, for example, a mixture of nickel and YSZ and generates electrons and water by reacting the oxide ion and hydrogen in the reformed gas. The air electrode is formed of, for example, a lanthanum strontium manganite and generates the oxide ion by reacting oxygen in air and electrons.

The fuel cell system 1 comprises a raw fuel material introduction unit 4 (means for introducing raw fuel material) which introduces the raw fuel material to the reforming catalyst 2a, a water introduction unit 5 (means for introducing water) which introduces a steam (water) to the reforming catalyst 2a, and an air introduction unit (means for introducing air to a cathode, which is not shown in the figure) which introduces an air to the cathode (air electrode). The raw fuel material introduction unit 4 has a raw fuel material introduction pipe to introduce the raw fuel material, a control valve to adjust an introduction amount of the raw fuel material, and the like. Similarly, the air introduction unit for the cathode has an air introduction pipe to introduce an air, a control valve to adjust an introduction amount of the air, and the like. In addition, the water introduction unit 5 has a water introduction pipe to introduce water, a control valve to adjust an introduction amount of the water, and the like. In this embodiment, the water introduction unit 5 introduces water to the reformer 2. This water is vaporized in the reformer 2 or a vaporizer installed separately from the reformer 2, and then introduced to the reforming catalyst 2a as a steam.

Further, the fuel cell system 1 comprises a plurality of temperature detectors 6 (means for detecting temperature) to detect the temperatures of the reforming catalyst 2a, a temperature detector 7 to detect the temperature of the fuel cell 3, and a control unit 8 (control means) to control the entire system. Each of the temperature detectors 6 and 7 is formed of, for example, a thermocouple. The temperature measurement contact point of each of temperature detector 6 is positioned on a central axis of the flow path of the raw fuel material introduced by the raw fuel material introduction unit 4.

Here, a reforming system 9 comprises the reformer 2, the raw fuel material introduction unit 4, the water introduction unit 5, the temperature detector 6, and the control unit 8.

Then, an operation method of the fuel cell system 1 will be described.

When Entering into a Cold Stand-By Mode:

An operation method of the fuel cell system 1 at the time of entering into a cold stand-by mode will be described with reference to FIG. 2. Here, the cold stand-by mode is meant by the state in which operation of the fuel cell system 1 is completely stopped and the fuel cell system 1 is in the stand-by mode with the cell temperature of the fuel cell 3 being at a room temperature. The cold stand-by mode is adopted when the termination time of power generation by the fuel cell 3 is relatively long, because the start-up of the fuel cell system 1 requires a long time.

Figure 2:
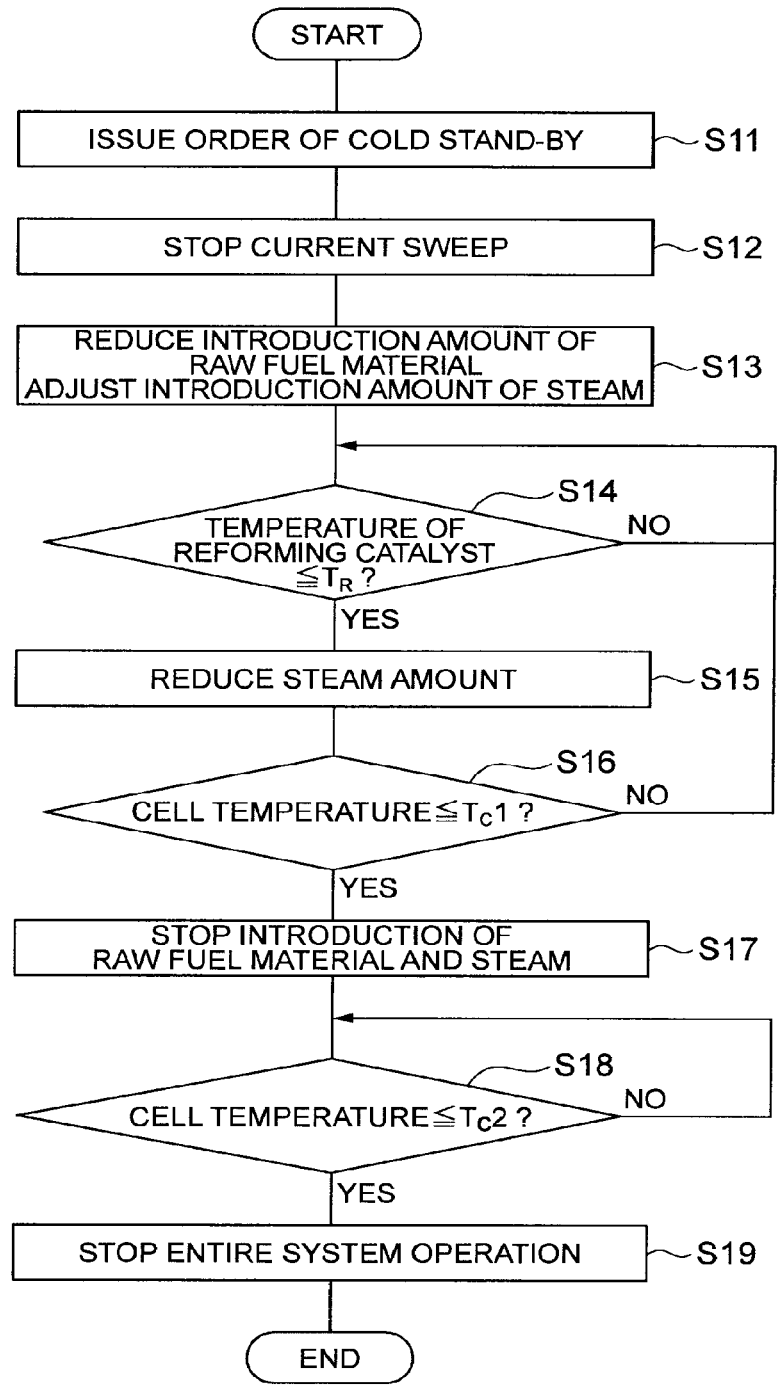
FIG. 2 is a flow chart of the operation method when the fuel cell system shown in FIG. 1 enters into a cold stand-by mode.

As shown in FIG. 2, firstly the cold stand-by order is issued from the control unit 8 (Step S11) and the current sweep from the fuel cell 3 is stopped (Step S12). In other word, the fuel cell 3 is controlled by the control unit 8 and the power generation by the fuel cell 3 is terminated. Subsequently, the raw fuel material introduction unit 4 is controlled by the control unit 8 and thus the introduction amount of the raw fuel material to the reforming catalyst 2a is reduced. Concurrently the water introduction unit 5 is controlled by the control unit 8 and the introduction amount of steam to the reforming catalyst 2a is adjusted (Step S13). In many cases, the introduction amount of the steam is reduced depending on the introduction amount of the raw fuel material. However, in a certain case, for example, where the operation is made in an excess of the steam, the introduction amount of the steam in Step S13 is increased depending on the introduction amount of the raw fuel material. Here, in this embodiment, there is Step S15 in which the introduction amount of the steam relative to the introduction amount of the raw fuel material is finely tuned, and thus in step S13 the introduction amount of the steam is roughly controlled so that the steam is in an excessive condition. In this way, the gradual reduction (or gradual increase) in the introduction amounts of the raw fuel material and the steam starts. By doing this, the cell temperature of the fuel cell 3 and the temperature of the reforming catalyst 2a begin dropping.

When the introduction amounts of the raw fuel material and the steam start to gradually decrease, whether or not the temperature of the reforming catalyst 2a detected by each temperature detector 6 is equal to or lower than $T_R$ is judged by the control unit 8 (Step S14). Here, $T_R$ is the temperature between the un-reformed gas generation temperature and the temperature of the reforming catalyst 2a at the time of a rated operation, and, for example, is 400 to 700° C. in the case where the raw fuel material is kerosene. $T_R$ is appropriately set in each temperature detector 6. Here, the temperature of generating the un-reformed gas means the temperature at which the raw fuel material is not completely reformed by the reforming catalyst 2a, thus a hydrocarbon gas having 2 or more carbon atoms (un-reformed gas) capable of damaging the cell of the fuel cell 3 is generated and starts being mixed into the reformed gas, wherein the temperature is preset depending on the introduction amount of the fuel. Incidentally, carbon monoxide in the reformed gas is converted to carbon dioxide and electrons by reacting with an oxide ion at the fuel electrode.

When the temperature of the reforming catalyst 2a detected by each temperature detector 6 is not more than $T_R$, the following control treatment of the steam amount is executed by the control unit 8 (Step S15). Namely, the water introduction unit 5 is controlled by the control unit 8, and thus the introduction amount of the steam to the reforming catalyst 2a is reduced by the water introduction unit 5. This, in turn, makes it possible to raise the temperature of the reforming catalyst 2a readily, and thus the generation of the un-reformed gas can be avoided without fail. In this way, the raw fuel material is introduced to the reforming catalyst 2a by the raw fuel material introduction unit 4 and the introduction amount of the steam to the reforming catalyst 2a is adjusted by the water introduction unit 5 as well, which results in realization of the highly efficient steam-reforming reaction.

While the above-described adjustment processing of the steam amount is executed, whether or not the cell temperature of the fuel cell 3 detected by the temperature detector 7 is not more than $T_c1$ is judged by the control unit 8 (Step S16). Here, $T_c1$ is the temperature at which the fuel cell 3 does not require the reformed gas as the reducing gas in the fuel electrode, wherein the temperature is within the range of 100 to 500° C., preferably 100 to 300° C., and more preferably 100 to 200° C. When the cell temperature detected by the temperature detector 7 is not more than $T_c1$, the raw fuel material introduction unit 4 and the water introduction unit 5 are controlled by the control unit 8, thus the introduction of the raw fuel material by the raw fuel material introduction unit 4 is stopped, and the introduction of the steam by the water introduction unit 5 is stopped (Step S17).

Subsequently, whether or not the cell temperature of the fuel cell 3 detected by the temperature detector 7 is not more than $T_c2$ is judged by the control unit 8 (Step S18). Here, $T_c2$ is the temperature at which the fuel cell 3 does not require introduction of an air to the cathode, wherein the temperature is preferably within the range of 50 to 200° C., and more preferably 50 to 100° C. When the cell temperature detected by the temperature detector 7 is not more than $T_c2$, operation of the entire system is stopped by the control unit 8 (Step S19), and then the fuel cell system 1 enters into the cold stand-by mode.

When Entering into a Hot Stand-By Mode:

An operation method of the fuel cell system 1 at the time of entering into a hot stand-by mode will be explained with reference to FIG. 3. Here, the hot stand-by mode means the state in which power generation by the fuel cell 3 is terminated and the fuel cell system 1 is in the stand-by mode with the cell temperature of the fuel cell 3 beings in the state of an operational temperature. The hot stand-by mode is adopted when the termination time of power generation by the fuel cell "3 is relatively short, because start-up of the fuel cell system 1 does not require a long time.

Figure 3:
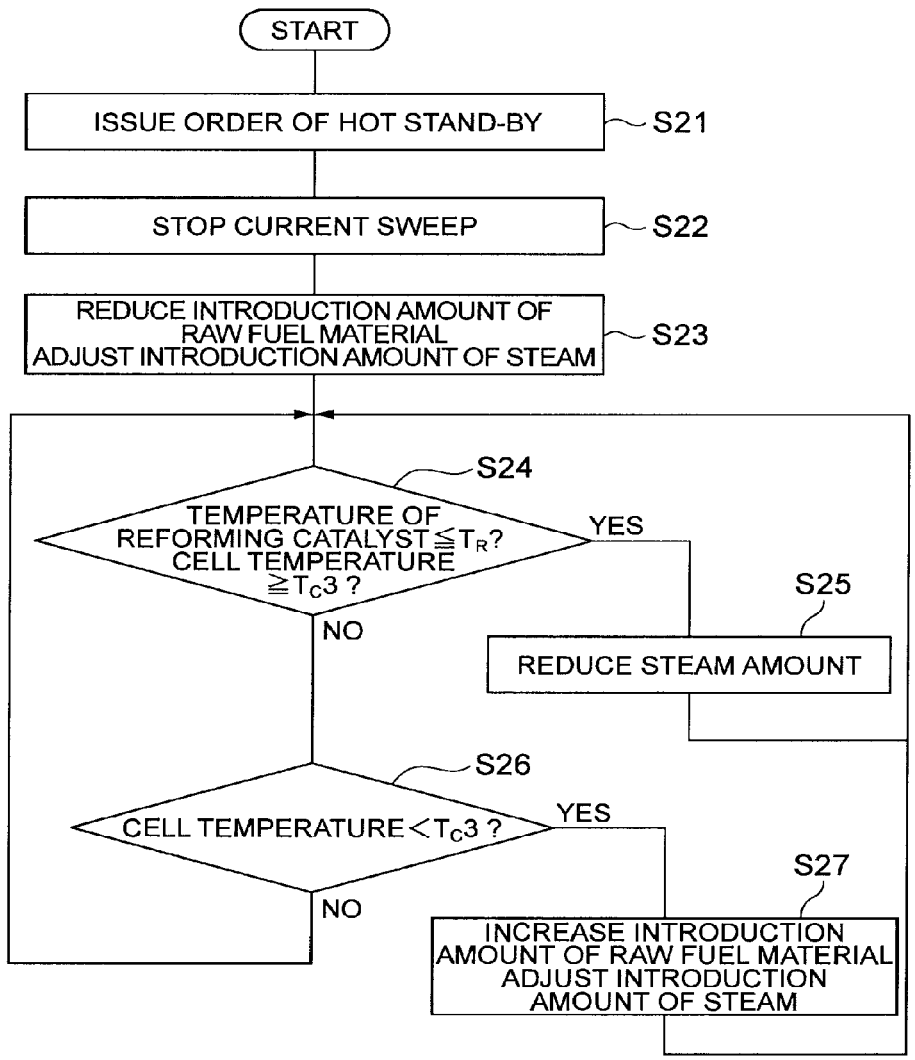
FIG. 3 is a flow chart of the operation method when the fuel cell system shown in FIG. 1 enters into a hot stand-by mode.

As shown in FIG. 3, first, the hot stand-by order is issued from the control unit 8 (Step S21) and the current sweep from the fuel cell 3 is stopped (Step S22). In other word, the fuel cell 3 is controlled by the control unit 8 to terminate the power generation by the fuel cell 3. Subsequently, the raw fuel material introduction unit 4 and the water introduction unit 5 are controlled by the control unit 8, the introduction amount of the raw fuel material to the reforming catalyst 2a is reduced and the introduction amount of the the steam step to the reforming catalyst 2a is adjusted (Step S23). In many cases, the introduction amount of the steam is reduced depending on the introduction amount of the raw fuel material. However, in some cases, for example, when the operation is made in an excess of the steam, the introduction amount of the steam in Step S23 is increased depending on the introduction amount of the raw fuel material. Here, in this embodiment, there are Step S25 and Step S 27 in which the introduction amount of the steam relative to the introduction amount of the raw fuel material is finely tuned, and thus in step S23, the steam introduction amount is roughly controlled so that the steam is in an excessive condition. In this way, the introduction amounts of the raw fuel material and the steam are reduced (or increased) as intended.

Whether the condition that the temperature of the reforming catalyst 2a detected by each temperature detector 6 is not more than $T_R$ and the cell temperature of the fuel cell 3 detected by the temperature detector 7 is not less than $T_C3$ is satisfied or not is judged by the control unit 8 (Step S24). Here, $T_C3$ is the operational temperature of the cell, and, in the case where the electrolyte is formed of YSZ, is within the range of 800 to 1,000° C. at which YSZ conducts an oxide ion.

When the result of judgment processing in Step S24 satisfies the condition, in order to avoid the generation of the un-reformed gas in the reformer 2, the adjustment processing of the steam amount described above is executed by the control unit 8, thus the introduction amount of the steam to the reforming catalyst 2a is reduced (Step S25), and then the loop goes back to the judgment processing of Step S24. On the other hand, when the result of the judgment processing in Step S24 does not satisfy the condition, whether or not the cell temperature of the fuel cell 3 detected by the temperature detector 7 is less than $T_C3$ is judged by the control unit 8 (Step S26).

When the result of the judgment processing in Step S26 shows the cell temperature of the fuel cell 3 is less than $T_C3$, in order to maintain the cell temperature at an operational temperature, the raw fuel material introduction unit 4 and the water introduction unit 5 are controlled by the control unit 8, thus the introduction amount of the raw fuel material to the reforming catalyst 2a is increased, and the introduction amount of the steam to the reforming catalyst 2a is concurrently adjusted (Step S27), and then the loop goes back to the judgment processing of Step S24. In many cases, the introduction amount of the steam is increased depending on the introduction amount of the raw fuel material. However, in a certain case, for example, when the steam is present in an excess condition, the introduction amount of the steam in Step S23 is reduced depending on the introduction amount of the raw fuel material. Here, the introduction amount of the raw fuel material is increased by the amount less than the predetermined amount reduced by the processing in Step S23. Further, the introduction amount of the steam is increased (or decreased) by the amount less than (or more than) the predetermined amount adjusted by the processing in Step S23. On the other hand, when the result of the judgment processing in Step S26 shows that the cell temperature of the fuel cell 3 is not less than $T_C3$, the loop goes back to the judgment processing in Step S24.

In this way, the reformed gas supplied to the fuel cell 3 from the reformer 2 is burnt in a burning chamber of the fuel cell 3, and then the fuel cell system 1 enters into the hot stand-by mode.

As described above, in the reforming system 9, the fuel cell system 1, and its operation method, the introduction amount of the raw fuel material into the reforming catalyst 2a in the reformer 2 is reduced when terminating power generation by the fuel cell 3. At this time, the temperature of the reforming catalyst 2a is raised by controlling the steam (water) introduction amount to the reforming catalyst 2a before the temperature of the reforming catalyst 2a is dropped to the temperature at which the un-reformed gas is generated. In this way, generation of the un-reformed gas at the time of terminating power generation by the fuel cell 3 is prevented and thus, the reformed gas is supplied to the fuel cell 3. Accordingly, the damage to the fuel cell 3 when terminating power generation by the fuel cell 3 can be avoided by a simple composition.

The temperature detector 7 detects temperatures of the reforming catalyst 2a at a central axis of the flow path of the raw fuel material. In this way, the temperature of the place where the reforming reaction takes place in the reforming catalyst 2a can be accurately detected.

The present invention is not limited to the embodiments as described above. For example, in Step S13 and Step S23 of the fuel cell system 1, the introduction amount of the steam is roughly controlled so that the steam is in an excess condition, but the fine tuning may also be done so that the introduction amount of the steam may be made optimum relative to the introduction amount of the raw fuel material under the steam-reforming condition.

In the fuel cell system 1, at the time of entering into the cold stand-by mode, the stop operation of the cold stand-by as explained above with reference to FIG. 2 may also be done by executing the stop processing of the current sweep (Step S12) after the output is dropped to an arbitrary partial load. In this case, the power generated before the execution of the stop processing of the current sweep (Step S12) may be, for example, stored in a condenser or consumed in a loading apparatus.

Further, an auto-thermal reforming reaction (ATR) or a partial oxidation reforming reaction by the reformer 2 may also be realized at the time of a rated operation of the fuel cell 3. In such cases, if the introduction amount of the raw fuel material to the reforming catalyst 2a of the reformer 2 is reduced, and the temperature of the reforming catalyst 2a is raised before the temperature of the reforming catalyst 2a is dropped to the temperature at which the un-reformed gas is generated, the generation of the un-reformed gas when terminating power generation by the fuel cell 3 can be prevented by a simple composition and a damage to the fuel cell 3 can be avoided. In addition, in these cases, catalysts heretofore known as the catalysts for the auto-thermal reforming reaction or the partial oxidation reforming reaction may be used as the reforming catalyst 2a. Namely, examples of the auto-thermal reforming catalyst can include a rhodium catalyst, and examples of the partial oxidation reforming catalyst can include a platinum catalyst.

The fuel cell system 1 may comprise further, as appropriate, a composition element heretofore known in an indirect internal SOFC. Specific examples of them include a vaporizer for vaporizing a liquid, a pump for pressurizing various fluids, a compressor, a pressurizing means such as a blower, a means such as a valve for controlling a flow rate of a fluid or for blocking/changing a fluid flow, and a means for blocking/changing flow path, a heat-exchanger for performing a heat-exchange and a heat-recovery, a condenser for condensing a gas, a heating and an insulating means for heating various instruments from outside, a means for storing a hydrocarbon fuel and a flammable material, an air and an electric system for instrumentation, a signal system for control, a controlling equipment, an electric system for an output and a power, and the like.

INDUSTRIAL APPLICABILITY

The present invention can be applied to the use in which a damage to a fuel cell can be avoided by a simple composition when terminating power generation by a solid oxide fuel cell.

The invention claimed is:

1. An operation method for a fuel cell system comprising introducing raw fuel material to a reforming catalyst;
introducing water to the reforming catalyst;
detecting the temperature of the reforming catalyst,
generating a reformed gas by using the reforming catalyst to reform the raw fuel material,
using the reformed gas as a fuel in a solid oxide fuel cell;
reducing the amount of water introduced to the reforming catalyst to raise the temperature of the reforming catalyst before the detected temperature of the reforming catalyst drops to the temperature at which an un-reformed gas is generated; and
reducing the amount of raw fuel material introduced to the reforming catalyst when power generation of the solid oxide fuel cell is terminated.

2. The operation method for a fuel cell system of claim 1, wherein said reducing the amount of water is conducted by a programmed control unit.

3. The operation method for a fuel cell system of claim 1, wherein said reducing the amount of raw fuel material is conducted by a programmed control unit.

4. The operation method for a fuel cell system of claim 1, wherein said detecting the temperature of the reforming catalyst is conducted by a plurality of temperature detectors.

5. The operation method for a fuel cell system of claim 4, further comprising positioning said temperature detectors on a central axis of a flow path of the raw fuel material.

6. The operation method for a fuel cell system of claim 1, wherein said detecting the temperature of the reforming catalyst is conducted by a temperature detector in the flow path of the raw fuel material.

* * * * *